US012051372B2

(12) United States Patent
Kim et al.

(10) Patent No.: US 12,051,372 B2
(45) **Date of Patent: *Jul. 30, 2024**

(54) DISPLAY DEVICE AND DRIVING METHOD THEREOF

(71) Applicant: Samsung Display Co., Ltd., Yongin-Si (KR)

(72) Inventors: Kyung Man Kim, Suwon-si (KR); Seok Gyu Ban, Suwon-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/140,682

(22) Filed: Apr. 28, 2023

(65) Prior Publication Data

US 2023/0282171 A1 Sep. 7, 2023

Related U.S. Application Data

(63) Continuation of application No. 17/717,261, filed on Apr. 11, 2022, now Pat. No. 11,670,240, which is a (Continued)

(30) Foreign Application Priority Data

Mar. 17, 2020 (KR) ........................ 10-2020-0032721

(51) Int. Cl.
*G09G 3/3266* (2016.01)
*G09G 3/3291* (2016.01)

(52) U.S. Cl.
CPC ......... *G09G 3/3266* (2013.01); *G09G 3/3291* (2013.01); *G09G 2310/0291* (2013.01); (Continued)

(58) Field of Classification Search
CPC ............... G09G 3/3266; G09G 3/3291; G09G 2310/0291; G09G 2320/0693; G09G 2330/028
See application file for complete search history.

(56) References Cited

U.S. PATENT DOCUMENTS 11,670,240 B2 * 6/2023 Kim .................... G09G 3/3233 345/76
2014/0152642 A1 6/2014 Kim et al.
(Continued)

FOREIGN PATENT DOCUMENTS

KR 10-2011-0028752 A 3/2011
KR 10-20140071097 A 6/2014
(Continued)

*Primary Examiner* — Kenneth B Lee, Jr.
(74) *Attorney, Agent, or Firm* — Innovation Counsel LLP

(57) ABSTRACT

A display device according to an exemplary embodiment of the present inventive concept includes: pixels; scan lines extending in a row direction and connected to the pixels; a data lines extending in a column direction and connected to the pixels; a receiving lines extending in the column direction and connected to the pixels; and a compensation circuit portion that generates first sensing data by receiving a current flowing to the pixels through the receiving lines, and generates a compensation value that compensates a characteristic of a driving transistor included in each of the pixels by multiplying the first sensing data by a calibration factor that corresponds to a position of each of the pixels, wherein the calibration factor includes a line calibration factors that correspond to the receiving lines.

23 Claims, 12 Drawing Sheets

Related U.S. Application Data continuation of application No. 17/124,581, filed on Dec. 17, 2020, now Pat. No. 11,328,673.

(52) U.S. Cl.
CPC ............... *G09G 2320/0693* (2013.01); *G09G 2330/028* (2013.01)

(56) References Cited

U.S. PATENT DOCUMENTS

| | | | |
|---|---|---|---|
| 2014/0340432 | A1 | 11/2014 | Chaji |
| 2015/0061981 | A1 | 3/2015 | Lee et al. |
| 2019/0206299 | A1 | 7/2019 | Kim et al. |
| 2021/0090498 | A1 | 3/2021 | Chang et al. |

FOREIGN PATENT DOCUMENTS

| | | | |
|---|---|---|---|
| KR | 10-2014-0082498 | A | 7/2014 |
| KR | 10-2014-0083185 | A | 7/2014 |
| KR | 10-1520584 | B1 | 5/2015 |
| KR | 10-2016-0055558 | A | 5/2016 |
| KR | 10-2017-0026929 | A | 3/2017 |
| KR | 10-20180021351 | A | 3/2018 |
| KR | 10-2005052 | B1 | 7/2019 |

* cited by examiner

FIG. 9

LUT

| | | | |
|---|---|---|---|
| RL1 | RL2 | · · · | RLm |
| CP1 | CP2 | · · · | CPm |

DISPLAY DEVICE AND DRIVING METHOD THEREOF

CROSS-REFERENCE TO RELATED APPLICATION

This application is a continuation application of U.S. patent application Ser. No. 17/717,261 filed on Apr. 11, 2022, which is a continuation application of U.S. patent application Ser. No. 17/124,581 filed on Dec. 17, 2020 (now U.S. Pat. No. 11,328,673), which claims priority to and the benefit of Korean Patent Application No. 10-2020-0032721 filed in the Korean Intellectual Property Office on Mar. 17, 2020, the entire contents of which are incorporated herein by reference.

BACKGROUND

(a) Field

Embodiments of the present inventive concept relate to a display device and a driving method thereof. More particularly, the present inventive concept relates to a display device that performs external compensation and a driving method thereof.

(b) Description of the Related Art

A display device is a display that displays an image. Recently, an organic light emitting diode OLED display has attracted attention.

The organic light emitting diode display has a self-luminous characteristic, and since it does not need a separate light source, unlike a liquid crystal display, it can have a relatively small thickness and weight. In addition, the organic light emitting diode display exhibits high-quality characteristics such as low power consumption, high luminance, high response speed, and the like.

A plurality of pixels included in the organic light emitting diode display respectively include organic light emitting diodes and driving transistors connected thereto. The driving transistor flows a current through the organic light emitting diode according to a data voltage applied thereto so that the organic light emitting diode emits light with luminance corresponding to the data voltage.

When driving transistors are degraded or threshold voltage shift occurs between driving transistors, an image of a desired color or brightness may not be displayed and image quality of the organic light emitting diode may be deteriorated.

The above information disclosed in this Background section is only for enhancement of understanding of the background of the inventive concept, and therefore it may contain information that does not form the prior art that is already known in this country to a person of ordinary skill in the art.

SUMMARY

A compensation circuit portion for compensating degradation of driving transistors and a deviation between threshold voltages between the driving transistors may measure a threshold voltage of a driving transistor included in each pixel by receiving a current flowing to the pixel. The threshold voltage of the driving transistor is referred to as a characteristic of the driving transistor. The compensation circuit portion compensates a data voltage based on a measured characteristic of a driving transistor such that image quality deterioration due to degradation of the driving transistors and a characteristic deviation between the driving transistors can be prevented from occurring. Such a method is called external compensation.

The current flowing to the plurality of pixels is received by the compensation circuit portion through a plurality of receiving lines. The compensation circuit portion may measure characteristics of driving transistors by measuring voltage values charged in the plurality of receiving lines. Characteristics of the plurality of receiving lines are included in the measured voltage values when measuring the characteristics of the driving transistors. The plurality of receiving lines may have different parasitic capacitance due to an error in a manufacturing process. When a data voltage is compensated using the measured value as it is, a compensation error may occur due to deviation of parasitic capacitance of the plurality of receiving lines.

A technical object to be solved by the present inventive concept is to provide a display device that can prevent a compensation error due to deviation of parasitic capacitance of a plurality of receiving lines from occurring when external compensation is performed.

A display device according to an exemplary embodiment of the present inventive concept includes: a plurality of pixels; a plurality of scan lines extending in a row direction and connected to the plurality of pixels; a plurality of data lines extending in a column direction and connected to the plurality of pixels; a plurality of receiving lines extending in the column direction and connected to the plurality of pixels; and a compensation circuit portion connected to the plurality of receiving lines, wherein the compensation circuit portion includes a plurality of sensing data generating circuits each of which generates a first sensing data by sensing current flowing through a receiving line, a calibration factor generator receiving the first sensing data and generating a calibration factor corresponds to a position of each of the plurality of pixels, and a calibration operation portion receiving the first sensing data and generating a compensation value compensating a characteristic of a driving transistor included in each of the plurality of pixels, and wherein the calibration factor comprises a plurality of line calibration factors corresponding to the plurality of receiving lines.

Any one of the plurality of line calibration factors may include a ratio of average second sensing data with respect to an x-th receiving line w to the receiving line.

The average first sensing data may comprise a value of averaging first sensing data corresponding to a factor detection area corresponding to some area in a display portion where the plurality of pixels are included for each of the receiving lines.

The average second sensing data may comprise a value of averaging second sensing data corresponding to the factor detection area for each of the receiving lines.

A sensing data generating circuit may include: an analog-digital converter; and an operational amplifier, wherein current flowing through the receiving line may be converted to the first sensing data by the analog-digital converter, and the current flowing through the receiving line may be converted to the second sensing data by the operational amplifier and the analog-digital converter.

The factor detection area may include one or more scan lines among the plurality of scan lines and a plurality of pixels connected to the one or more scan lines included in the factor detection area.

The factor detection area may include a plurality of areas spaced apart from each other in the column direction.

The compensation circuit portion may comprise a lookup table including the plurality of line calibration factors corresponding to the plurality of receiving lines.

The compensation circuit portion may include a filter removing noise included in the calibration factor.

The filter may include a low-pass filter.

A display device according to another exemplary embodiment of the present inventive concept includes: a sensing data generator including a plurality of sensing data generating circuits, each of the plurality of sensing data generating circuits is connected to a receiving line which is connected to a plurality of pixels, includes an analog-digital converter and an operational amplifier, receives current flowing through a plurality of receiving lines by way of a plurality of pixels connected to the plurality of receiving lines, converts the current to first sensing data by using the analog-digital converter, and converts the current to second sensing data by using the operational amplifier and the analog-digital converter; a calibration factor generator connected to the plurality of sensing data generating circuits, generates average first sensing data by averaging the first sensing data for each receiving line, generates average second sensing data by averaging the second sensing data for each receiving line, and calculates a calibration factor which is a ratio of the average second sensing data to the average first sensing data for each receiving line; and a calibration operation portion generating a compensation value compensating a characteristic of a driving transistor included in each of the plurality of pixels by multiplying the first sensing data by a calibration factor that corresponding to a position of the plurality of pixels.

The display device may further include a filter connected between the calibration factor generator and the calibration operation portion and removes noise included in the calibration factor by using a low-pass filter.

According to another exemplary embodiment of the present inventive concept, a method for driving a display device is provided. The method for driving the display device includes: receiving current flowing through a plurality of receiving lines by way of a plurality of pixels connected to the plurality of receiving lines; converting the current to first sensing data by using a plurality of sensing data generating circuit each of which includes an analog-digital converter; and generating a plurality of compensation values each of which compensates a characteristic of a driving transistor included in each of the plurality of pixels by multiplying the first sensing data by a calibration factor that corresponds to the each of the plurality of pixels, wherein the calibration factor comprises a plurality of line calibration factors corresponding to the plurality of receiving lines.

The method for driving the display device may further include: converting the current to second sensing data by an operational amplifier included in each of the plurality of sensing data generating circuit and the analog-digital converter; generating average first sensing data by averaging the first sensing data for each of the plurality of receiving lines; generating average second sensing data by averaging the second sensing data for each of the plurality of receiving lines; and calculating the calibration factor which is a ratio of the average second sensing data to the average first sensing data.

The method for driving the display device may further include storing the plurality of line calibration factors that correspond to the plurality of receiving lines as a lookup table.

The method for driving the display device may further include removing noise included in the calibration factor by using a low-pass filter.

The average first sensing data may be generated by averaging first sensing data that correspond to a factor detection area that corresponds to some area of a display device where the plurality of pixels are included for each receiving line.

The average second sensing data may be generated by averaging second sensing data corresponding to the factor detection for each receiving line.

The factor detection area may include one or more scan lines included the plurality of scan lines that are connected to the plurality of pixels and a plurality of pixels that are connected to the scan lines included in the factor detection area.

The factor detection area may include a plurality of areas that are spaced apart from each other in a column direction.

The display device can remove a deviation of parasitic capacitance in the plurality of receiving lines and accure sensing data having a high SNR. The display device can prevent a compensation error due to the deviation of the parasitic capacitance in the plurality of receiving lines from occurring, thereby performing more accurate external compensation.

BRIEF DESCRIPTION OF THE DRAWINGS

FIG. 9 exemplarily shows a lookup table included in a calibration factor generator according to the exemplary embodiment of the present inventive concept.

DETAILED DESCRIPTION

Figure 1:
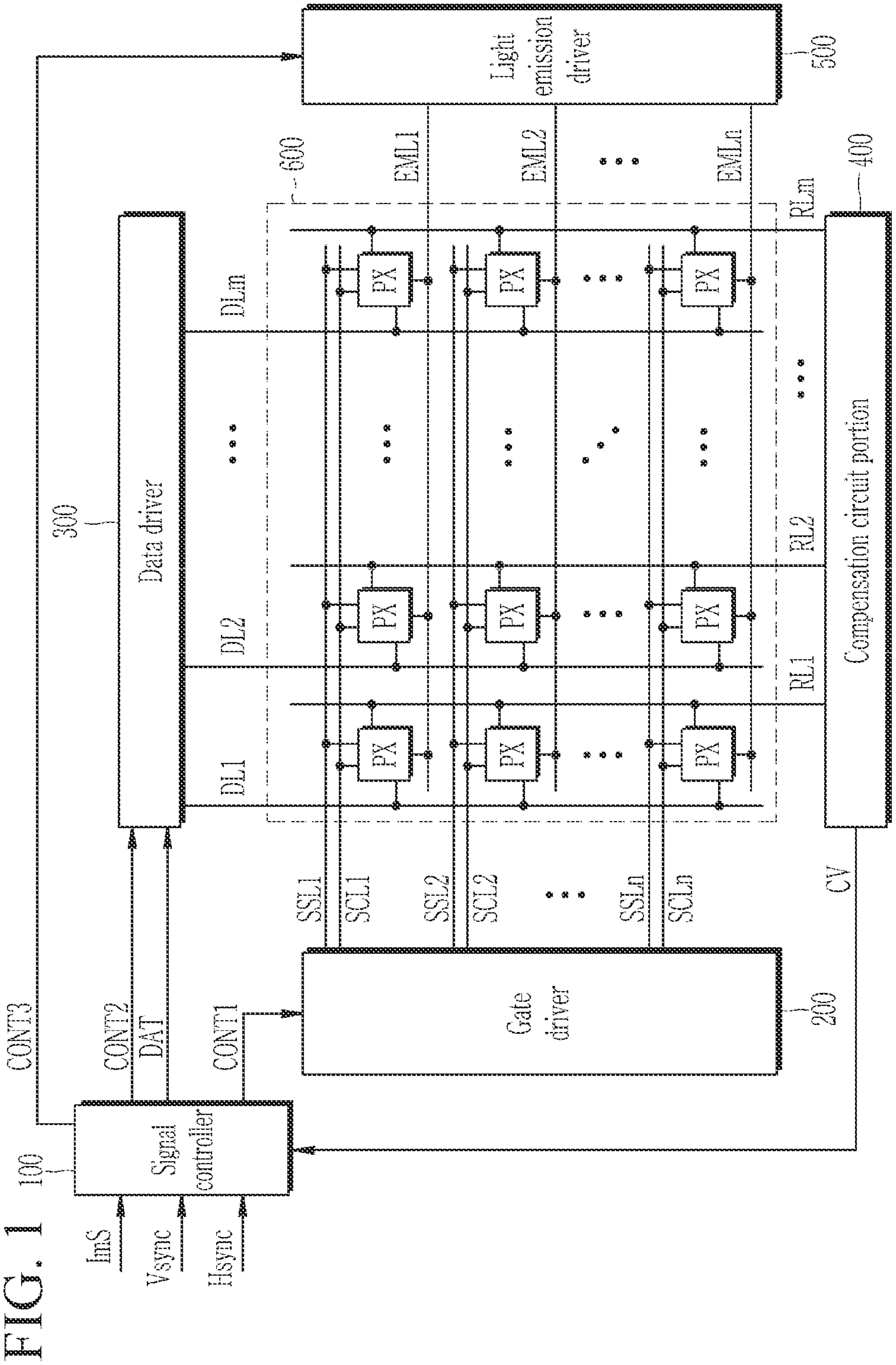
FIG. 1 is a block diagram of a display device according to an exemplary embodiment of the present inventive concept.

Embodiments of the present inventive concept will be described more fully hereinafter with reference to the accompanying drawings, in which exemplary embodiments of the inventive concept are shown. As those skilled in the art would realize, the described embodiments may be modified in various different ways, all without departing from the spirit or scope of the present inventive concept.

Further, in the exemplary embodiments, since like reference numerals designate like elements having the same configuration, a first exemplary embodiment is representatively described, and in other exemplary embodiments, only different configurations from the first exemplary embodiment will be described.

Accordingly, the drawings and description are to be regarded as illustrative in nature and not restrictive. Like reference numerals designate like elements throughout the specification.

Since the size and thickness of each component shown in the drawings are arbitrarily shown for better understanding and ease of description, the present inventive concept is not necessarily limited to what is shown. In the drawings, the thickness of layers, films, panels, regions, etc., are exaggerated for clarity.

Throughout the specification, unless explicitly described to the contrary, the word "comprise" and variations such as "comprises" or "comprising" will be understood to imply the inclusion of stated elements but not the exclusion of any other elements.

FIG. 1 is a block diagram of a display device according to an exemplary embodiment of the present inventive concept.

Referring to FIG. 1, a display device includes a signal controller 100, a gate driver 200, a data driver 300, a compensation circuit portion 400, a light emission driver 500, and a display portion 600.

The signal controller 100 receives a video signal ImS and a synchronization signal from the outside, for example, from a graphic controller. The video signal ImS includes luminance information of a plurality of pixels PX. Luminance includes a predetermined number of gray levels. The synchronization signal may include a vertical synchronization signal Vsync and a horizontal synchronization signal Hsync.

The signal controller 100 may classify the video signal ImS into frame units according to the vertical synchronization signal Vsync, and may classify the video signal ImS into scan lines SCL1 to SCLn units according to the horizontal synchronization signal Hsync. The signal controller 100 appropriately processes the video signal ImS according to operation conditions of the display portion 600 and the data driver 300 based on the video signal ImS and the synchronization signal, and may generate an image data signal DAT, a first control signal CONT1, a second control signal CONT2, and a third control signal CONT3. The signal controller 100 transmits the first control signal CONT1 to the gate driver 200. The signal controller 100 transmits the second control signal CONT2 and the image data signal DAT to the data driver 300. The signal controller 100 transmits the third control signal CONT3 to the light emission driver 500.

The display portion 600 includes a plurality of scan lines SCL1 to SCLn, a plurality of sensing signal lines SSL1 to SSLn, a plurality of data lines DL1 to DLm, a plurality of receiving lines RL1 to RLm, a plurality of light emitting lines EML1 to EMLn, and a plurality of pixels PX. The plurality of pixels PX may be connected to a plurality of scan lines SCL1 to SCLn, a plurality of sensing signal lines SSL1 to SSLn, a plurality of data lines DL1 to DLm, a plurality of receiving lines RL1 to RLm, and a plurality of light emitting lines EML1 to EMLn. The plurality of scan lines SCL1 to SCLn extend approximately in a row direction and thus may extend substantially parallel with each other. The plurality of sensing signal lines SSL1 to SSLn extend approximately in a row direction and thus may extend substantially parallel with each other. The plurality of data lines DL1 to DLm extend approximately in a column direction and thus may extend substantially parallel with each other. The plurality of receiving lines RL1 to RLm extend approximately in a column direction and thus may extend substantially parallel with each other. The plurality of light emitting lines EML1 to EMLn extend approximately in a row direction and thus may extend substantially parallel with each other. The display portion 600 may correspond to a display area where an image is displayed. The display area may correspond to a screen where an image is displayed.

Figure 2:
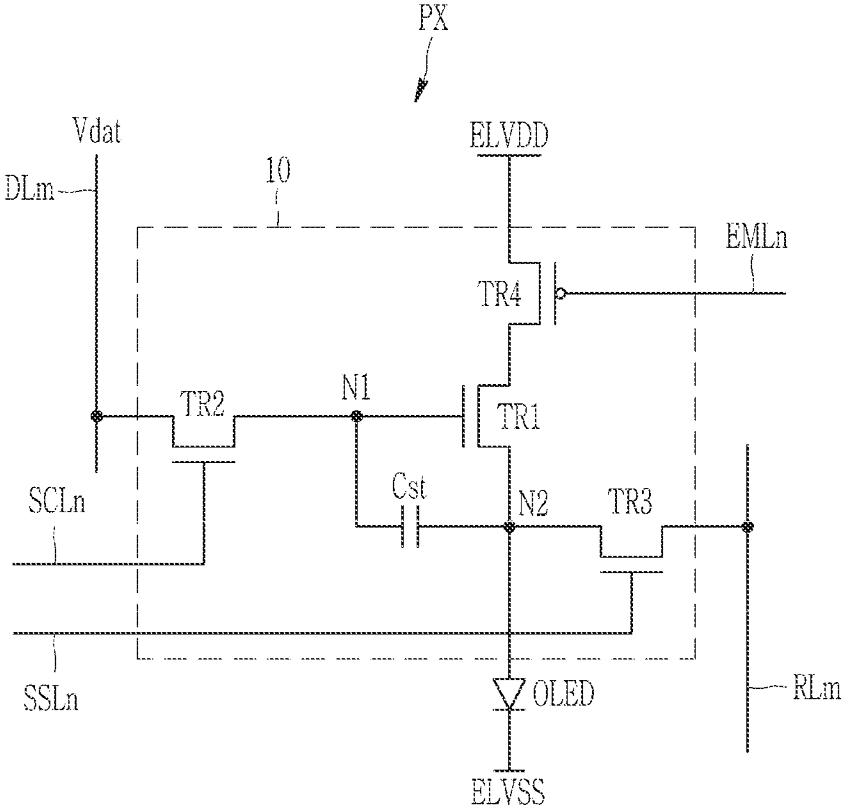
FIG. 2 is a circuit diagram of a pixel according to the exemplary embodiment of the present inventive concept.

Although it is not illustrated, the display portion 600 may be supplied with a first power source voltage ELVDD (refer to FIG. 2) and a second power source voltage ELVSS (refer to FIG. 2). The first power source voltage ELVDD may be a high level voltage provided to an anode of an organic light emitting diode OLED (refer to FIG. 2) included in each of the plurality of pixels PX. The second power source voltage ELVSS may be a low level voltage provided to a cathode of the organic light emitting diode OLED included in each of the plurality of pixels PX. The first power source voltage ELVDD and the second power source voltage ELVSS are driving voltages for light emission of the plurality of pixels PX.

The gate driver 200 is connected to a plurality of scan lines SCL1 to SCLn and a plurality of sensing signal lines SSL1 to SSLn. The gate driver 200 applies a scan signal to the plurality of scan lines SCL1 to SCLn in response to the first control signal CONT1, and applies a sensing signal to a plurality of sensing signal lines SSL1 to SSLn. The scan signal may include a gate-on voltage and a gate-off voltage. The sensing signal may include the gate-on voltage and the gate-off voltage. The gate driver 200 may sequentially apply a scan signal of a gate-on voltage to the plurality of scan lines SCL1 to SCLn. The gate driver 200 may sequentially apply a sensing signal of a gate-on voltage to the plurality of sensing signal lines SSL1 to SSLn.

The data driver 300 is connected to the plurality of data lines DL1 to DLm, samples and holds the image data signal DAT in response to the second control signal CONT2, and applies a data voltage Vdat (refer to FIG. 2) to the plurality of data lines DL1 to DLm. The data driver 300 may apply the data voltages Vdat to the plurality of data lines DL1 to DLm in response to the scan signal of the gate-on voltage. Each of the data voltages Vdat may have a value within a predetermined voltage range.

The compensation circuit portion 400 is connected to a plurality of receiving lines RL1 to RLm, and receives current Ipx (refer to FIG. 3) flowing by way of the plurality of pixels PX through the plurality of receiving lines RL1 to RLm. The compensation circuit portion 400 may measure a characteristic of a driving transistor TR1 (refer to FIG. 2) included in each of the plurality of pixels PX using the received current Ipx. The characteristic of the driving transistor TR1 may include a threshold voltage of the driving transistor TR1. The compensation circuit portion 400 may calculate characteristic deviations between the plurality of driving transistors TR1 included in the plurality of pixels PX using the measured characteristics of the driving transistors TR1. The compensation circuit portion 400 may generate compensation values CV based on the characteristic deviations between the plurality of driving transistors TR1 and provide the compensation values CV to the signal controller 100. The compensation values CV may include values that compensate deviations between the driving transistors TR1 included in the plurality of pixels PX.

The compensation circuit portion 400 may generate a compensation value CV from which a deviation of parasitic capacitances of each of the plurality of receiving lines RL1 to RLm is removed by using a calibration factor CP (refer to FIG. 3) with respect to each of the plurality of receiving lines RL1 to RLm. A method for calibrating parasitic capacitance deviation of the plurality of receiving lines RL1 to RLm will be described later.

The signal controller 100 generates an image data signal DAT by applying the compensation value to the video signal ImS, and the data driver 300 may generates the data voltage Vdat according to the image data signal DAT to which the compensation value CV is applied. Since the image data signal DAT is generated by applying the compensation value CV to the video signal ImS, deterioration of image quality due to deterioration of the driving transistor TR1 and the deviation between the plurality of driving transistors TR1 can be prevented.

As described above, a method for receiving current flowing through a plurality of pixels PX and compensating degradation of the driving transistor TR1 included in each of the plurality of pixels PX and deviation between the plurality of driving transistors TR1 based on the received current is called external compensation.

In FIG. 1, the compensation circuit portion 400 is provided separately from the signal controller 100, but according to an exemplary embodiment, the compensation circuit portion 400 may be included in the signal controller 100.

The light emission driver 500 is connected to a plurality of light emitting lines EML1 to EMLn. The light emission driver 500 applies a light emission signal to the plurality of light emitting lines EML1 to EMLn in response to the third control signal CONT3. The light emission signal may include the gate-on voltage and the gate-off voltage. The light emission driver 500 may sequentially or simultaneously apply a light emission signal of the gate-on voltage to the plurality of light emitting lines EML1 to EMLn.

FIG. 2 is a circuit diagram of a pixel according to an exemplary embodiment of the present inventive concept. A pixel located in an n-th pixel row and an m-th pixel column among the plurality of pixels PX included in the display device of FIG. 1 will be exemplarily described.

Referring to FIG. 2, a pixel PX includes an organic light emitting diode OLED and a pixel circuit 10.

The pixel circuit 10 is formed to control a current flowing through the organic light emitting diode OLED from the first power source voltage ELVDD. The pixel circuit 10 may include a driving transistor TR1, a switching transistor TR2, a sensing transistor TR3, a light emitting transistor TR4, and a storage capacitor Cst.

The driving transistor TR1 includes a gate electrode connected to a first node N1, a first electrode to which the first power source voltage ELVDD is applied through the light emitting transistor TR4, and a second electrode connected to a second node N2. The driving transistor TR1 is connected between the first power source voltage ELVDD and the organic light emitting diode OLED, and controls a current flowing through the organic light emitting diode OLED from the first power source voltage ELVDD corresponding to a voltage of the first node N1.

The switching transistor TR2 includes a gate electrode connected to the scan line SCLn, a first electrode connected to the data line DLm, and a second electrode connected to the first node N1. The switching transistor TR2 is connected between the data line DLm and the driving transistor TR1. The switching transistor TR2 is turned on by the scan signal of the gate-on voltage, applied to the scan line SCLn, and thus transmits the data voltage Vdat applied to the data line DLm to the first node N1.

The sensing transistor TR3 includes a gate electrode connected to a sensing signal line SSLn, a first electrode connected to the second node N2, and a second electrode connected to a receiving line RLm. The sensing transistor TR3 is connected between the second electrode of the driving transistor TR1 and the receiving line RLm. The sensing transistor TR3 is turned on by a sensing signal of the gate-on voltage, applied to the sensing signal line SSLn, and thus transmits a current flowing to the organic light emitting diode OLED through the sensing signal driving transistor TR1 to the receiving line RLm. Meanwhile, the receiving line RLm may be used as a wire for transmission of an initialization voltage to the second node N2. As the initialization voltage is applied to the second node N2 through the receiving line RLm, an anode voltage of the organic light emitting diode OLED may be initialized.

The light emitting transistor TR4 includes a gate electrode connected to the light emitting line EMLn, a first electrode to which the first power source voltage ELVDD is applied, and a second electrode connected to the first electrode of the driving transistor TR1. The light emitting transistor TR4 is turned on by a light emission signal of the gate-on signal, applied to the light emitting line EMLn, and thus transmits the first power source voltage ELVDD to the first electrode of the driving transistor TR1.

The driving transistor TR1, the switching transistor TR2, and the sensing transistor TR3 may be N-type transistors, and the light emitting transistor TR4 may be a P-type transistor. A gate-on voltage that turns on the N-type transistor is a high-level voltage and a gate-off voltage that turns off the N-type transistor is a low-level voltage. A gate-on voltage that turns on the P-type transistor is a low-level voltage and a gate-off voltage that turns off the P-type transistor is a high-level voltage. Depending on exemplary embodiments, at least one of the driving transistor TR1, the switching transistor TR2, and the sensing transistor TR3 may be a P-type transistor, and the light emitting transistor TR4 may be an N-type transistor.

The storage capacitor Cst includes a first electrode connected to the first node N1 and a second electrode connected to the second node N2. The data voltage Vdat is transmitted to the first node N1 through the switching transistor TR2 and the storage capacitor Cst serves to maintain a voltage of the first node N1.

The organic light emitting diode OLED includes an anode connected to the second node N2 and a cathode to which the second power source voltage ELVSS is applied. The organic light emitting diode OLED may emit light with luminance that corresponds to a current supplied from the pixel circuit 10. The organic light emitting diode OLED may emit light of one of primary colors or light of white. The primary colors exemplarily include three primary colors of red, green, and blue. Alternatively, the primary colors may include yellow, cyan, and magenta.

During external compensation, a scan signal of a gate-on voltage is applied to the scan line SCLn, a data voltage Vdat of a predetermined level is applied to the data line DLm, and a light emission signal of a gate-on voltage is applied to the light emitting line EMLn. The data voltage Vdat of the predetermined level is applied to the gate electrode of the driving transistor TR1, and current flows to the organic light emitting diode OLED from the first power source voltage ELVDD through the driving transistor TR1. In this case, a sensing signal of a gate-on voltage is applied to the sensing signal line SSLn and thus the current flowing to the organic light emitting diode OLED may be transmitted to the compensation circuit portion 400 through the sensing transistor TR3.

Hereinafter, a configuration and a method for compensating deviation of parasitic capacitance of the plurality of receiving lines RL1 to RLm will be described with reference to FIG. 3 to FIG. 10.

Figure 3:
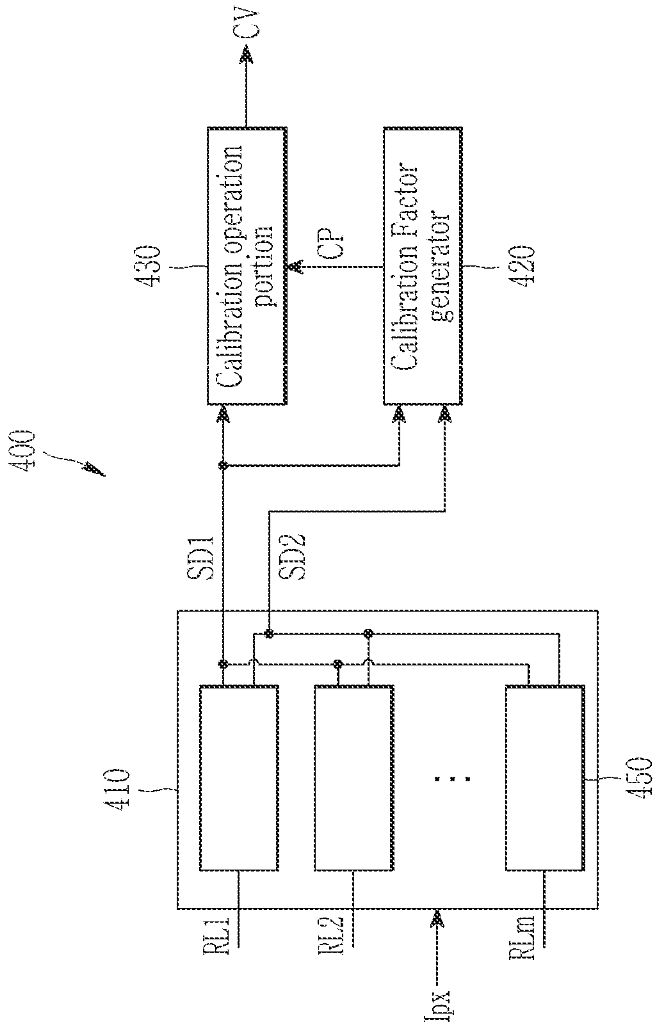
FIG. 3 is a block diagram of the compensation circuit according to the exemplary embodiment of the present inventive concept.
Figure 4:
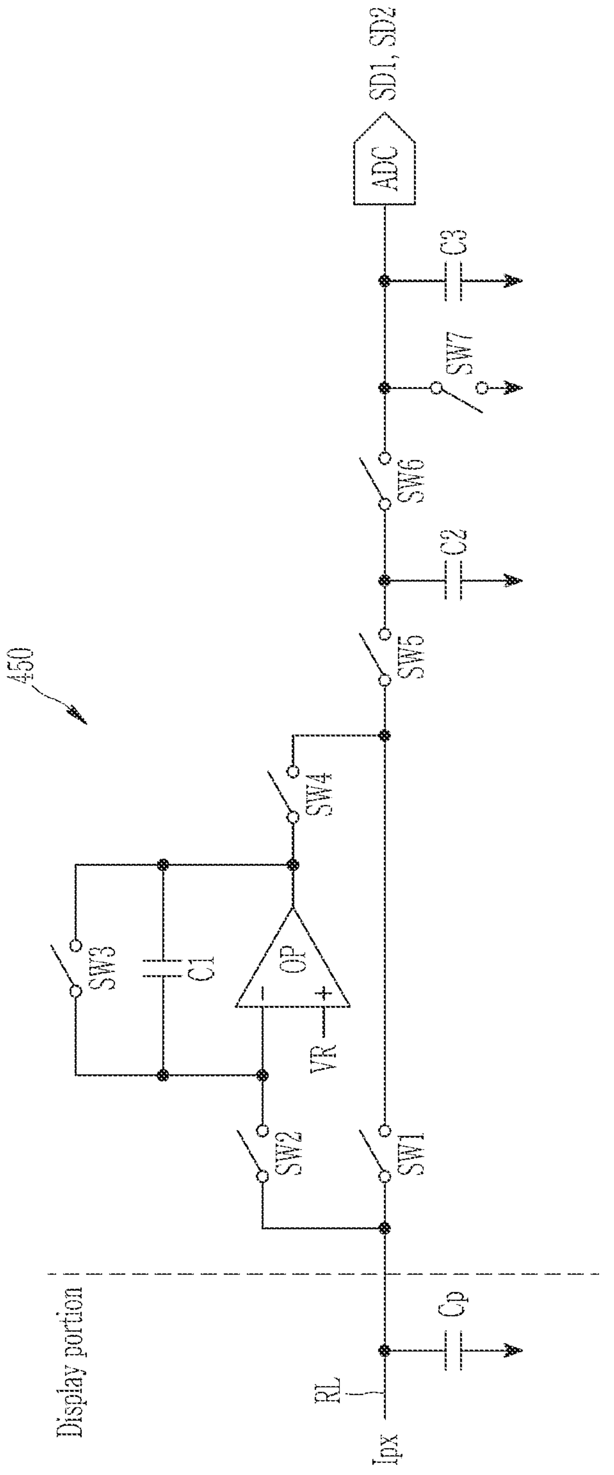
FIG. 4 is a circuit diagram of a sensing data generator according to the exemplary embodiment of the present inventive concept.
Figure 5:
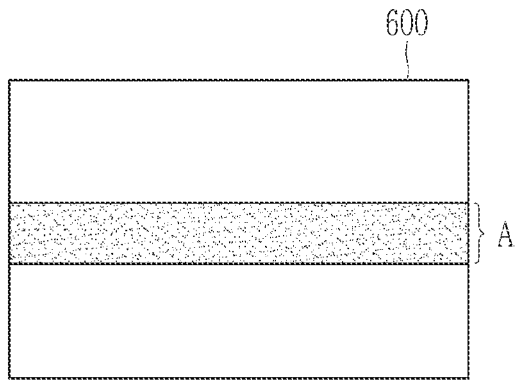
FIG. 5 shows a factor detection area according to the exemplary embodiment of the present inventive concept.
Figure 6:
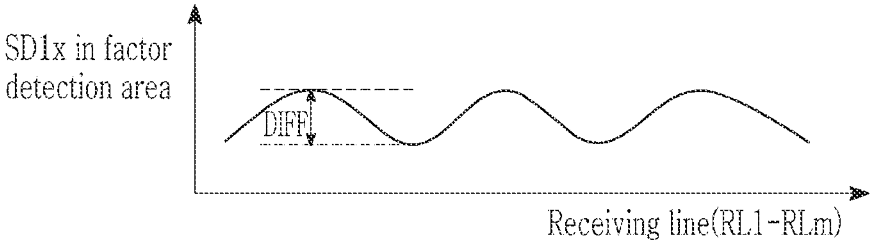
FIG. 6 is a graph that shows average first sensing data in the factor detection area with respect to a receiving line according to the exemplary embodiment of the present inventive concept.
Figure 7:
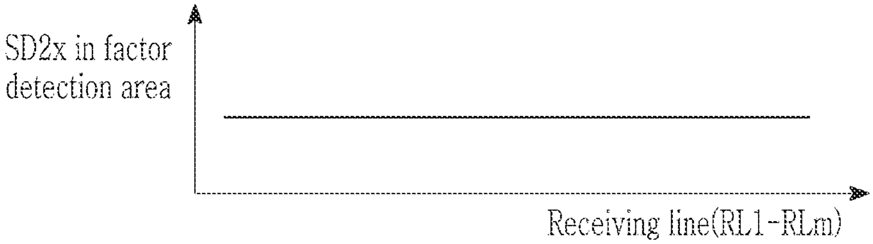
FIG. 7 is a graph that shows average second sensing data in the factor detection area with respect to a receiving line according to the exemplary embodiment of the present inventive concept.
Figure 8:
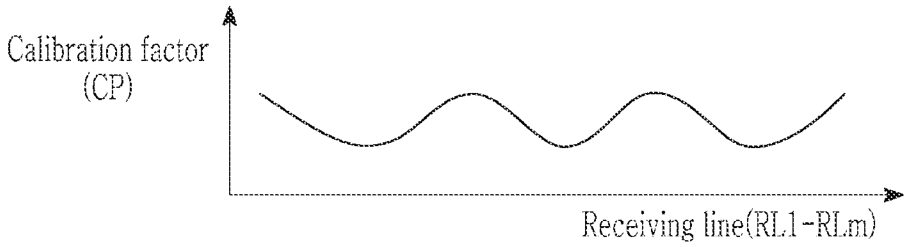
FIG. 8 is a graph that shows a calibration factor with respect to the receiving line according to the exemplary embodiment of the present inventive concept.
Figure 10:
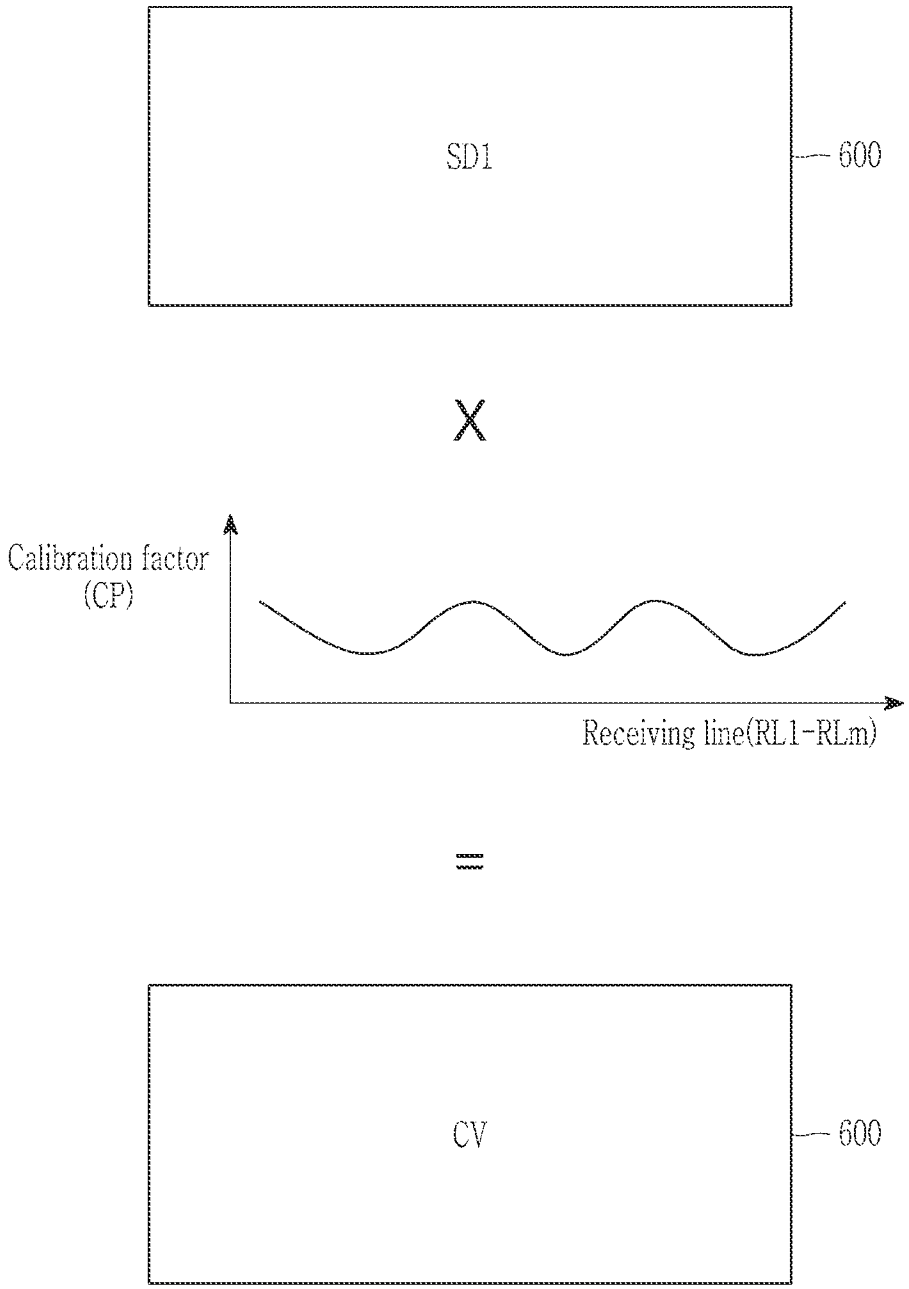
FIG. 10 is a schematic view of a method for calculating a compensation value with respect to the plurality of pixels by a calibration operation portion according to the exemplary embodiment of the present inventive concept.

FIG. 3 is a block diagram of the compensation circuit portion according to the exemplary embodiment of the present inventive concept. FIG. 4 is a circuit diagram of a sensing data generator according to the exemplary embodiment of the present inventive concept. FIG. 5 shows a factor detection area according to the exemplary embodiment of the present inventive concept. FIG. 6 is a graph that shows average first sensing data in the factor detection area with respect to a receiving line according to the exemplary embodiment of the present inventive concept. FIG. 7 is a graph that shows average second sensing data in the factor detection area with respect to a receiving line according to the exemplary embodiment of the present inventive concept. FIG. 8 is a graph that shows a calibration factor with respect to the receiving line according to the exemplary embodiment of the present inventive concept. FIG. 9 exemplarily shows a lookup table included in a calibration factor generator according to the exemplary embodiment of the present inventive concept. FIG. 10 is a schematic view of a method for calculating a compensation value with respect to the plurality of pixels by a calibration operation portion according to the exemplary embodiment of the present inventive concept.

Referring to FIG. 3 and FIG. 4, the compensation circuit portion 400 includes a sensing data generator 410, a calibration factor generator 420, and a calibration operation portion 430.

The sensing data generator 410 includes a plurality of sensing data generating circuits 450 connected to the plurality of receiving lines RL1 to RLm, respectively. The plurality of sensing data generating circuits 450 receives current Ipx flowing by way of the plurality of pixels PX connected to the plurality of sensing data generating circuits 450 through the plurality of receiving lines RL1 to RLm, and outputs first sensing data SD1 and second sensing data SD2. The sensing data generator 410 may transmit the first sensing data SD1 to the calibration factor generator 420 and the calibration operation portion 430. The sensing data generator 410 may transmit the second sensing data SD2 to the calibration factor generator 420.

FIG. 4 exemplarily illustrates a sensing data generating circuit 450 that is connected one of the plurality of receiving lines RL1 to RLm. The sensing data generating circuit receives the current Ipx flowing by way of the pixel PX connected to the receiving line RL. The receiving line RL has a parasitic capacitor Cp. Parasitic capacitors Cp of the plurality of receiving lines RL1 to RLm may be different from each other due to a process error.

The sensing data generating circuit 450 may include a plurality of switches SW1, SW2, SW3, SW4, SW5, SW6, and SW7, a plurality of capacitors C1, C2, and C3, an operational amplifier OP, and an analog-digital converter (ADC).

The operational amplifier OP includes a first input terminal (+), a second input terminal (−), and an output terminal. The first switch SW1 and the second switch SW2 are connected in parallel. One end of the first switch SW1 and the second switch SW2 are connected to the receiving line RL.

The first switch SW1 transmits the current Ipx of the receiving line RL to the ADC without passing through the operational amplifier OP. The fifth switch SW5 and the sixth switch SW6 are connected between the first switch SW1 and the ADC, and the current Ipx of the receiving line RL may be directly transmitted to the ADC through the first switch SW1, the fifth switch SW5, and the sixth switch SW6. The current Ipx transmitted without passing through the operational amplifier OP may be converted to the first sensing data SD1 by the ADC.

The second switch SW2 transmits the current Ipx of the receiving line RL to the second input terminal (−) of the operational amplifier OP. A reference voltage VR is applied to the first input terminal (+) of the operational amplifier OP. The third switch SW3 is connected between the second input terminal (−) and the output terminal of the operational amplifier OP. The first capacitor C1 is connected between the second input terminal (−) and the output terminal of the operational amplifier OP. The fourth switch SW4 is connected between the output terminal of the operational amplifier OP and the fifth switch SW5. A voltage output to the output terminal of the operational amplifier OP may be converted to the second sensing data SD2 by the ADC.

The second capacitor C2 may include a first electrode connected between the fifth switch SW5 and the sixth switch SW6, and a second electrode connected to a ground. The third capacitor C3 may include a first electrode connected between the sixth switch SW6 and the ADC, and a second electrode connected to the ground. The seventh switch SW7 may be connected between the first electrode of the third capacitor C3 and the ground. The second capacitor C2 and the third capacitor C3 may be charged with the current Ipx transmitted through the first switch SW1 or an output voltage through the operational amplifier OP. The sixth switch SW6 may perform the function of temporally separating the charging of the second capacitor C2 and the charging of the third capacitor C3. The seventh switch SW7 may perform the function of discharging the voltage charged in the second capacitor C2 or the third capacitor C3.

The first sensing data SD1 generated from the sensing data generating circuit 450 may be transmitted to the calibration factor generator 420 and the calibration operation portion 430. The second sensing data SD2 generated from the sensing data generating circuit 450 may be transmitted to the calibration factor generator 420.

The calibration factor generator 420 may receive a plurality of first sensing data SD1 with respect to the plurality of receiving lines RL1 to RLm and a plurality of second sensing data SD2 with respect to the plurality of receiving lines RL1 to RLm from a plurality of sensing data generating circuits 450 connected to the plurality of receiving lines RL1 to RLm.

The calibration operation portion 430 may receive the plurality of first sensing data SD1 with respect to the plurality of receiving lines RL1 to RLm from the plurality of sensing data generating circuits 450 connected to the plurality of receiving lines RL1 to RLm.

The calibration factor generator 420 may generate a calibration factor CP by using the plurality of first sensing data SD1 with respect to the plurality of receiving lines RL1 to RLm and the plurality of second sensing data SD2 with respect to the plurality of receiving lines RL1 to RLm. The calibration factor generator 420 may store the generated calibration factor CP. The calibration factor CP may include a plurality of line calibration 10 factors CP1 to CPm corresponding to the plurality of receiving lines RL1 to RLm. The plurality of line calibration factors CP to CPm may be respectively calculated by Equation 1.

$$CPx = \frac{SD2x}{SD1x} \quad \text{(Equation 1)}$$

Here, CPx denotes a line calibration factor corresponding to an x-th receiving line RLx, SD1*x* denotes average first sensing data with respect to the x-th receiving line RLx, and SD2*x* is average second sensing data with respect to the x-th receiving line RLx. x is 1 or more and m or less. m may correspond to the number of receiving lines RL1 to RLm included in the display portion 600.

The average first sensing data SD1*x* may be acquired by averaging the first sensing data SD1 corresponding to some area in the display area. The average second sensing data SD2*x* may be acquired by averaging the second sensing data SD2 corresponding to the area.

As exemplarily shown in FIG. 5, a factor detection area A that corresponds to some area may be selected in the display portion 600. The factor detection area A may be an area that includes one or more scan lines among the plurality of scan lines SCL1 to SCLn. The factor detection area A may include a plurality of pixels PX connected to the included scan lines.

The calibration factor generator 420 may generate the average first sensing data SD1*x* by averaging the first sensing data SD1 corresponding to the factor detection area A for each of the receiving lines RL1 to RLm. The calibration factor generator 420 may generate the average second sensing data SD2*x* by averaging the second sensing data SD2 corresponding to the factor detection area A for each of the receiving lines RL1 to RLm.

As exemplarily shown in FIG. 6, deviations DIFF exist in the average first sensing data SD1*x* of the factor detection area A according to the receiving lines RL1 to RLm. The first sensing data SD1 is generated without passing through the operational amplifier OP, and thus output time of the first sensing data SD1 is relatively short and a signal-to-noise ratio (SNR) is high. On the other hand, parasitic capacitance of the receiving lines RL1 to RLm is included in the first sensing data SD1. The deviation DIFF according to the receiving lines RL1 to RLm that exists in the average first sensing data SD1*x* may be caused by deviation of parasitic capacitance of the receiving lines RL1 to RLm.

As exemplarily illustrated in FIG. 7, the average second sensing data SD2*x* of the factor detection area A may have almost a constant value irrelevant to the receiving lines RL1 to RLm. Since the second sensing data SD2 is generated through the operational amplifier OP, output time of the second sensing data SD2 is relatively long and a signal-to-noise ratio (SNR) is low. On the other hand, parasitic capacitance of the receiving lines RL1 to RLm is not included in the second sensing data SD2.

As exemplarily illustrated in FIG. 8, calibration factors CP with respect to the receiving lines RL1 to RLm may be generated. The calibration factors CP may include line calibration factors CP to CPm respectively corresponding to the plurality of receiving lines RL1 to RLm.

The calibration factor generator 420 transmits the calibration factor CP to the calibration operation portion 430. That is, the calibration factor generator 420 transmits the line calibration factors CP to CPm respectively corresponding to the plurality of receiving lines RL1 to RLm to the calibration operation portion 430.

As exemplarily illustrated in FIG. 9, the plurality of line calibration factors CP to CPm corresponding to the plurality of receiving lines RL1 to RLm may be stored as a lookup table (LUT) in the calibration factor generator 420. The calibration factor generator 420 may transmit the line calibration factors CP to CPm stored in the lookup table LUT to the calibration operation portion 430.

Meanwhile, in a manufacturing process of the display device, the lookup table LUT including the calibration factor CP may be pre-stored in the calibration factor generator 420. In such a case, in a display device, the sensing data generator 410 includes only the ADC and thus the first sensing data SD1 is transmitted only to the calibration operation portion 430, and a configuration that generates the second sensing data SD2 can be omitted.

The calibration operation portion 430 generates a compensation value CV with respect to each of the plurality of pixels PX included in the display portion 600 by using the first sensing data SD1 and the calibration factor CP.

As exemplarily shown in FIG. 10, the calibration operation portion 430 may generate a compensation value CV with respect to each of the plurality of pixels PX by multiplying a calibration factor CP corresponding to a location of the corresponding pixel PX in a row direction to first sensing data SD1 with respect to each of the plurality of pixels PX included in the display portion 600.

That is, the compensation value CV can be calculated by Equation 2.

$$CV_{x,y} = SD1_{x,y} \times CP_x \quad \text{(Equation 2)}$$

Here, CVx,y is a compensation value with respect to a pixel PX connected to an x-th scan line SCLx and a y-th data line DLy, SD1*x,y* is first sensing data with respect to the pixel PX connected to the x-th scan line SCLx (or an x-th receiving line RLx) and the y-th data line DLy, and CPx is a line calibration factor corresponding to the x-th receiving line RLx. x is 1 or more and m or less, and y is 1 or more and n or less. m may correspond to the number of receiving lines RL1 to RLm included in the display portion 600, and n may correspond to the number of scan lines SCL1 to SCLn included in the display portion 600.

Parasitic capacitance of the receiving lines RL1 to RLm included in the first sensing data SD1 may be removed by multiplying the first sensing data SD1 for each of the plurality of pixel PXs by the calibration factor CP corresponding to the position of the pixel PX. Since the deviation of the parasitic capacitance between the receiving lines RL1 to RLm occurs due to the receiving lines RL1 to RLm, the same calibration factor CP may be applied to pixels PX connected to the same receiving lines RL1 to RLm regardless of the position of the column direction of the pixel PX. The compensation value CV includes sensing data in which deviation of parasitic capacitance of receiving lines RL1 to RLm is removed.

Since the compensation value CV is generated by multiplying the first sensing data SD1 having a short output time and a high signal-to-noise ratio by a calibration factor CP, a compensation value CV having a high signal-to-noise ratio can be generated. Because external compensation is performed by using such a compensation value CV, a compensation error due to the deviation of parasitic capacitance of the receiving lines RL1 to RLm may be eliminated. Thus, more accurate external compensation can be performed.

Previously, in FIG. 5, the exemplary embodiment in which one factor detection area A is selected in the display portion 600 was described. Depending on exemplary embodiments, a plurality of areas may be selected as factor detection areas A in the display portion 600. This will be described with reference to FIG. 11.

Figure 11:
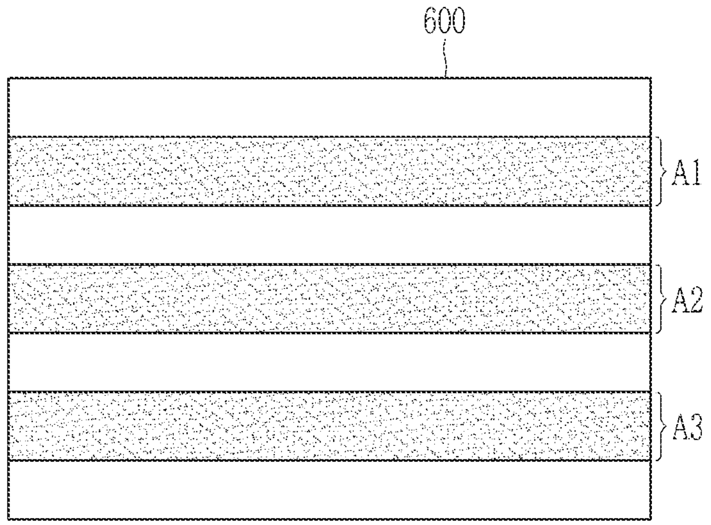
FIG. 11 is a factor detection area according to another exemplary embodiment of the present inventive concept.

FIG. 11 is a factor detection area according to another exemplary embodiment of the present inventive concept.

Referring to FIG. 11, a plurality of factor detection areas A1, A2, and A3 may be selected in a display portion 600. The plurality of factor detection areas A1, A2, and A3 may be spaced apart from each other in a column direction. Each of the plurality of factor detection areas A1, A2, and A3 may be an area including one or more scan lines. Each of the plurality of factor detection areas A1, A2, and A3 may include a plurality of pixels PX connected to the included scan lines.

A calibration factor generator 420 receives first sensing data SD1 corresponding to a factor detection area A1, first sensing data SD1 corresponding to a second factor detection area A2, and first sensing data SD1 corresponding to a third factor detection area A3. The calibration factor generator 420 may generate average first sensing data SD1*x* by averaging the first sensing data SD1 corresponding to the plurality of factor detection areas A1, A2, and A3 for each of the receiving lines RL1 to RLm. Alternatively, the calibration factor generator 420 may generate average first sensing data SD1*x* for each of the receiving lines RL1 to RLm by calculating average first sensing data SD1*x* in each of the plurality of factor detection areas A1, A2, and A3 and performing filtering using, for example, a median filter on the average first sensing data SD1*x* of each of the plurality of factor detection area A1, A2, and A3.

In addition, the calibration factor generator 420 receives second sensing data SD2 corresponding to the first factor detection area A1, second sensing data SD2 corresponding to the second factor detection area A2, and second sensing data SD2 corresponding to the third factor detection area A3. The calibration factor generator 420 may generate average second sensing data SDx2 by averaging the second sensing data SD2 corresponding to the plurality of factor detection areas A1, A2, and A3 for each of the receiving lines RL1 to RLm. Alternatively, the calibration factor generator 420 may generate average second sensing data SD2*x* for each of the receiving lines RL1 to RLm by calculating average second sensing data SD2*x* in each of the plurality of factor detection areas A1, A2, and A3 and performing filtering using, for example, a median filter on the average second sensing data SD2*x* of each of the plurality of factor detection area A1, A2, and A3.

The calibration factor generator 420 may calculate a calibration factor CP' that includes a plurality of line calibration factors CP1' to CP'm by applying the generated average first sensing data SD1*x* and the average second sensing data SD2*x* to Equation 1.

The accuracy of the calibration factor CP can be improved by using the first sensing data SD1 and the second sensing data SD2 for the plurality of factor detection areas A1, A2, and A3.

Meanwhile, noise may be included in the first sensing data SD1 and the second sensing data SD2. Due to the noise included in the first sensing data SD1 and the second sensing data SD2, the calibration factor CP may also include noise. When the noise is included in the calibration factor CP, the accuracy of the calibration factor CP may be lowered. In order to improve the accuracy of the calibration factor CP, it is necessary to remove the noise in the first sensing data SD1 and the second sensing data SD2, and this will be explained with reference to FIG. 12 and FIG. 13.

Figure 12:
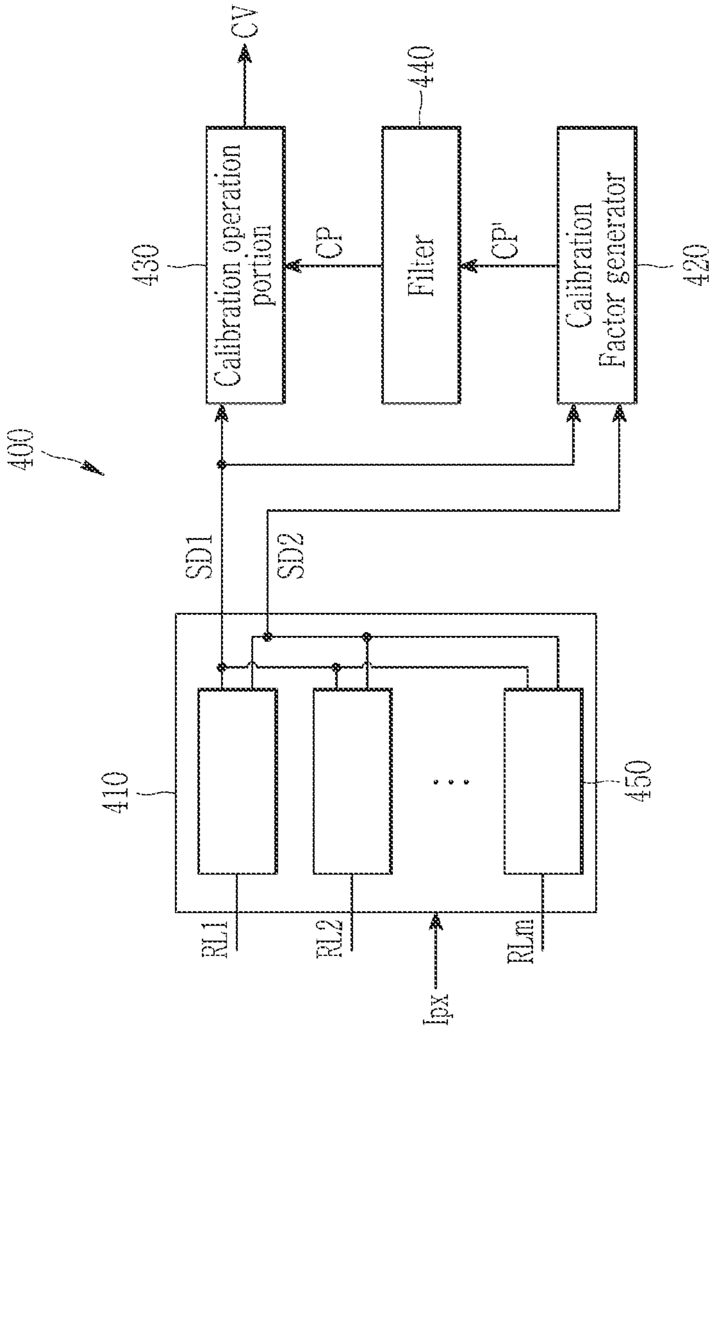
FIG. 12 is a block diagram of a compensation circuit portion according to another exemplary embodiment of the present inventive concept.
Figure 13:
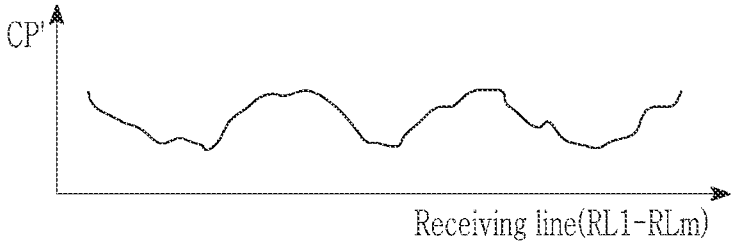
FIG. 13 is a graph that shows a calibration factor before being filtered by a filter of FIG. 12.

FIG. 12 is a block diagram of a compensation circuit portion according to another exemplary embodiment of the present inventive concept. FIG. 13 is a graph that shows a calibration factor before being filtered by a filter of FIG. 12.

Referring to FIG. 12 and FIG. 13, the compensation circuit portion 400 may further include a filter 440. The filter 440 is connected between a calibration factor generator 420 and a calibration operation portion 430.

The filter 440 receives a calibration factor CP' in which noise is included from the calibration factor generator 420. The noise-included calibration factor CP' may be generated in the form of a mixture of low and high frequencies as exemplarily shown in FIG. 13.

The filter 440 may be a low-pass filter, and may remove high-frequency components from the noise-included calibration factor CP'. The high frequency component corresponds to noise generated in a process of generating first sensing data SD1 and second sensing data SD2. A noise-removed calibration factor CP may consist of only low-frequency components as exemplarily illustrated in FIG. 8.

The filter 440 may transmit the noise-removed calibration factor CP to the calibration operation portion 430. The noise-removed calibration factor CP may be generated as a lookup table (LUT) as exemplary illustrated in FIG. 9.

Except for such a difference, the features of the exemplary embodiment described with reference to FIG. 1 to FIG. 11 may be applied to the exemplary embodiment described with reference to FIG. 12 and FIG. 13, and therefore duplicated features will not be further described.

While this inventive concept has been described in connection with what is presently considered to be practical example embodiments, it is to be understood that the inventive concept is not limited to the disclosed embodiments, but, on the contrary, is intended to cover various modifications and equivalent arrangements included within the spirit and scope of the appended claims. Therefore, it will be appreciated by those skilled in the art that various modifications may be made and other equivalent embodiments are available. Therefore, a true technical scope of the present inventive concept will be defined by the technical spirit of the appending claims.

What is claimed is:

1. A display device comprising:
- a plurality of pixels;
- a plurality of scan lines extending in a row direction and connected to the plurality of pixels;
- a plurality of data lines extending in a column direction and connected to the plurality of pixels;
- a plurality of receiving lines extending in the column direction and connected to the plurality of pixels; and
- a compensation circuit portion connected to the plurality of receiving lines, wherein the compensation circuit portion includes:
- a plurality of sensing data generating circuits each of which generates a first sensing data and a second sensing data by sensing current flowing through a receiving line, a calibration factor generator receiving the first sensing data and generating a calibration factor corresponds to a position of each of the plurality of pixels, and a calibration operation portion receiving the first sensing data and generating a compensation value compensating a characteristic of a driving transistor included in each of the plurality of pixels, wherein the calibration factor comprises a plurality of line calibration factors corresponding to the plurality of receiving lines, wherein the plurality of sensing data generating circuit comprises:

an analog-digital converter, and an operational amplifier, and wherein current flowing through the receiving line is converted to the first sensing data by the analog-digital converter and to the second sensing data by the operational amplifier and the analog-digital converter.

2. The display device of claim 1, wherein deviations exist in average first sensing data of a factor detection area according to the plurality of receiving lines.

3. The display device of claim 2, wherein the deviations according to the plurality of receiving lines that exists in the average first sensing data is caused by deviation of parasitic capacitance of the plurality of receiving lines.

4. The display device of claim 1, wherein any one of the plurality of line calibration factors comprises a ratio of average second sensing data to the average first sensing data with respect to the receiving line.

5. The display device of claim 4, wherein the average second sensing data of the factor detection area has a constant value irrelevant to the plurality of receiving lines.

6. The display device of claim 4, wherein the average first sensing data comprises a value of averaging first sensing data corresponding to the factor detection area corresponding to some area in a display portion where the plurality of pixels are included for each of the plurality of receiving lines.

7. The display device of claim 6, wherein the average second sensing data comprises a value of averaging second sensing data corresponding to the factor detection area for each of the plurality of receiving lines.

8. The display device of claim 7, wherein the factor detection area comprises one or more scan lines among the plurality of scan lines and a plurality of pixels connected to the one or more scan lines included in the factor detection area.

9. The display device of claim 7, wherein the factor detection area comprises a plurality of areas spaced apart from each other in the column direction.

10. The display device of claim 1, wherein the compensation circuit portion comprises a lookup table including the plurality of line calibration factors corresponding to the plurality of receiving lines.

11. The display device of claim 1, wherein the compensation circuit portion comprises a filter removing noise included in the calibration factor.

12. The display device of claim 11, wherein the filter comprises a low-pass filter.

13. A method for driving a display device, comprising:

receiving current flowing through a plurality of receiving lines by way of a plurality of pixels connected to the plurality of receiving lines;

converting the current to first sensing data by using a plurality of sensing data generating circuit each of which includes an analog-digital converter;

converting the current to second sensing data by an operational amplifier and the analog-digital converter included in each of the plurality of sensing data generating circuit;

generating average first sensing data by averaging the first sensing data for each of the plurality of receiving lines;

generating average second sensing data by averaging the second sensing data for each of the plurality of receiving lines;

calculating a calibration factor which is a ratio of the average second sensing data to the average first sensing data; and generating a plurality of compensation values each of which compensates a characteristic of a driving transistor included in each of the plurality of pixels by multiplying the first sensing data by a calibration factor that corresponds to the each of the plurality of pixels, wherein the calibration factor comprises a plurality of line calibration factors corresponding to the plurality of receiving lines.

14. The method for driving the display device of claim 13, wherein deviations exist in average first sensing data of a factor detection area according to the plurality of receiving lines.

15. The method for driving the display device of claim 14, wherein the deviations according to the plurality of receiving lines that exists in the average first sensing data is caused by deviation of parasitic capacitance of the plurality of receiving lines.

16. The method for driving the display device of claim 13, wherein any one of the plurality of line calibration factors comprises a ratio of average second sensing data to the average first sensing data with respect to the receiving line.

17. The method for driving the display device of claim 16, wherein the average second sensing data of a factor detection area has a constant value irrelevant to the plurality of receiving lines.

18. The method for driving the display device of claim 17, further comprising storing the plurality of line calibration factors that correspond to the plurality of receiving lines in a lookup table.

19. The method for driving the display device of claim 17, further comprising removing noise included in the calibration factor by using a low-pass filter.

20. The method for driving the display device of claim 17, wherein the average first sensing data is generated by averaging first sensing data that correspond to a factor detection area that corresponds to some area of a display device where the plurality of pixels are included for each receiving line.

21. The method for driving the display device of claim 20, wherein the average second sensing data is generated by averaging second sensing data corresponding to the factor detection area for each receiving line.

22. The method for driving the display device of claim 21, wherein the factor detection area comprises one or more scan lines that are connected to a plurality of pixels in the factor detection area and the plurality of pixels that are connected to the one or more scan lines are included in the factor detection area.

23. The method for driving the display device of claim 21, wherein the factor detection area comprises a plurality of factor detection areas that are spaced apart from each other in a column direction.

* * * * *